(12) United States Patent
Nishida et al.

(10) Patent No.: US 8,368,755 B2
(45) Date of Patent: Feb. 5, 2013

(54) PHOTOGRAPHING APPARATUS, IMAGE SIGNAL CHOOSING APPARATUS, DRIVING ASSISTING APPARATUS AND AUTOMOBILE

(75) Inventors: Toshio Nishida, Yokohama (JP); Hirotomo Sai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1423 days.

(21) Appl. No.: 11/638,369

(22) Filed: Dec. 14, 2006

(65) Prior Publication Data

US 2007/0139523 A1 Jun. 21, 2007

(30) Foreign Application Priority Data

Dec. 15, 2005 (JP) .................................. 2005-361179

(51) Int. Cl.
*H04N 7/18* (2006.01)

(52) U.S. Cl. ........ 348/148; 348/143; 348/124; 348/113; 348/146; 340/438; 340/435; 340/436

(58) Field of Classification Search .......... 348/143–169, 348/113–124; 340/438, 435–436
See application file for complete search history.

(56) References Cited

U.S. PATENT DOCUMENTS

| | | | |
|---|---|---|---|
| 2003/0108222 A1* | 6/2003 | Sato et al. | 382/104 |
| 2003/0122930 A1* | 7/2003 | Schofield et al. | 348/148 |
| 2005/0003844 A1* | 1/2005 | Nishiga et al. | 455/517 |

FOREIGN PATENT DOCUMENTS

| | | |
|---|---|---|
| JP | 2001-105566 | 4/2001 |
| JP | 2002-367080 | 12/2002 |
| JP | 2004-351977 | 12/2004 |
| JP | 2005-157581 | 6/2005 |

OTHER PUBLICATIONS

Office Action in JP Appln. 2005-361179, dated Jun. 1, 2010 (in Japanese) [3 pages].

* cited by examiner

*Primary Examiner* — Wing F Chan
*Assistant Examiner* — Hitesh Patel
(74) *Attorney, Agent, or Firm* — Antonelli, Terry, Stout & Kraus, LLP.

(57) ABSTRACT

Considering the locations of a self-vehicle and other vehicles changing from moment to moment, an image signal is chosen in relation to the location, orientation, viewing angle, and moving speed of a camera mounted on each vehicle, and information on a region to be a driver's blind spot is provided in real time by means of images and voice. When there is the other vehicles whose camera meets requirements such as the location, orientation, viewing angle, and moving speed for photographing a region to be the self-vehicle's blind spot, it is possible to provide information on the blind spot by the image picked up by the camera. However, since the other vehicle's location also changes with a lapse of time, it is not possible to keep photographing the blind spot with the same camera. Therefore, the image of the driver's blind spot is obtained in real time by constantly detecting the location, orientation, viewing angle, and moving speed of cameras mounted on the other vehicles running near the self-vehicle, choosing dynamically a camera capable of photographing the region to be the self-vehicle's blind spot, and switching image signals in succession.

11 Claims, 8 Drawing Sheets

FIG.2(a)
FIG.2(b)
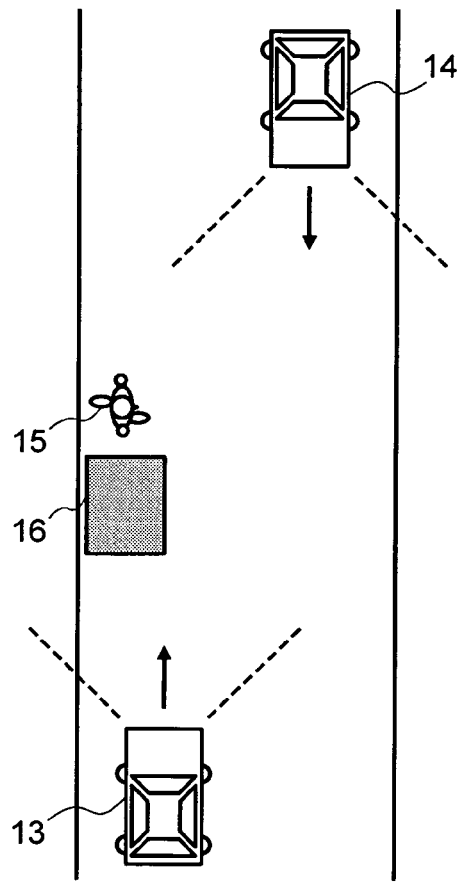
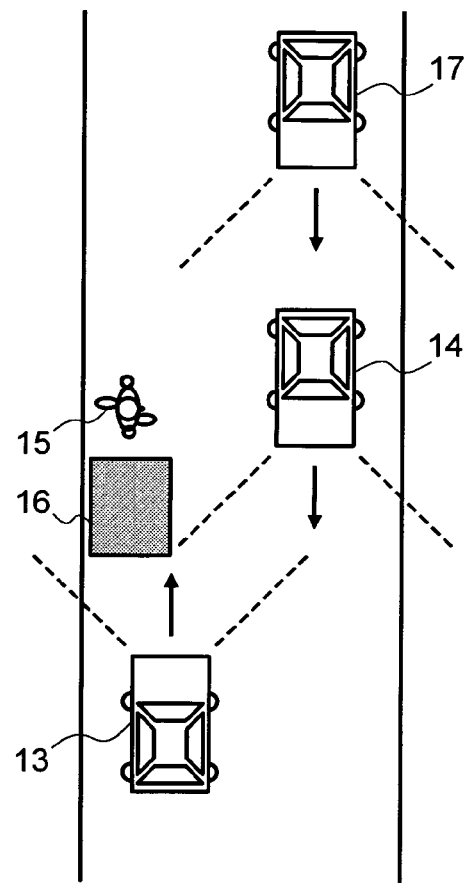

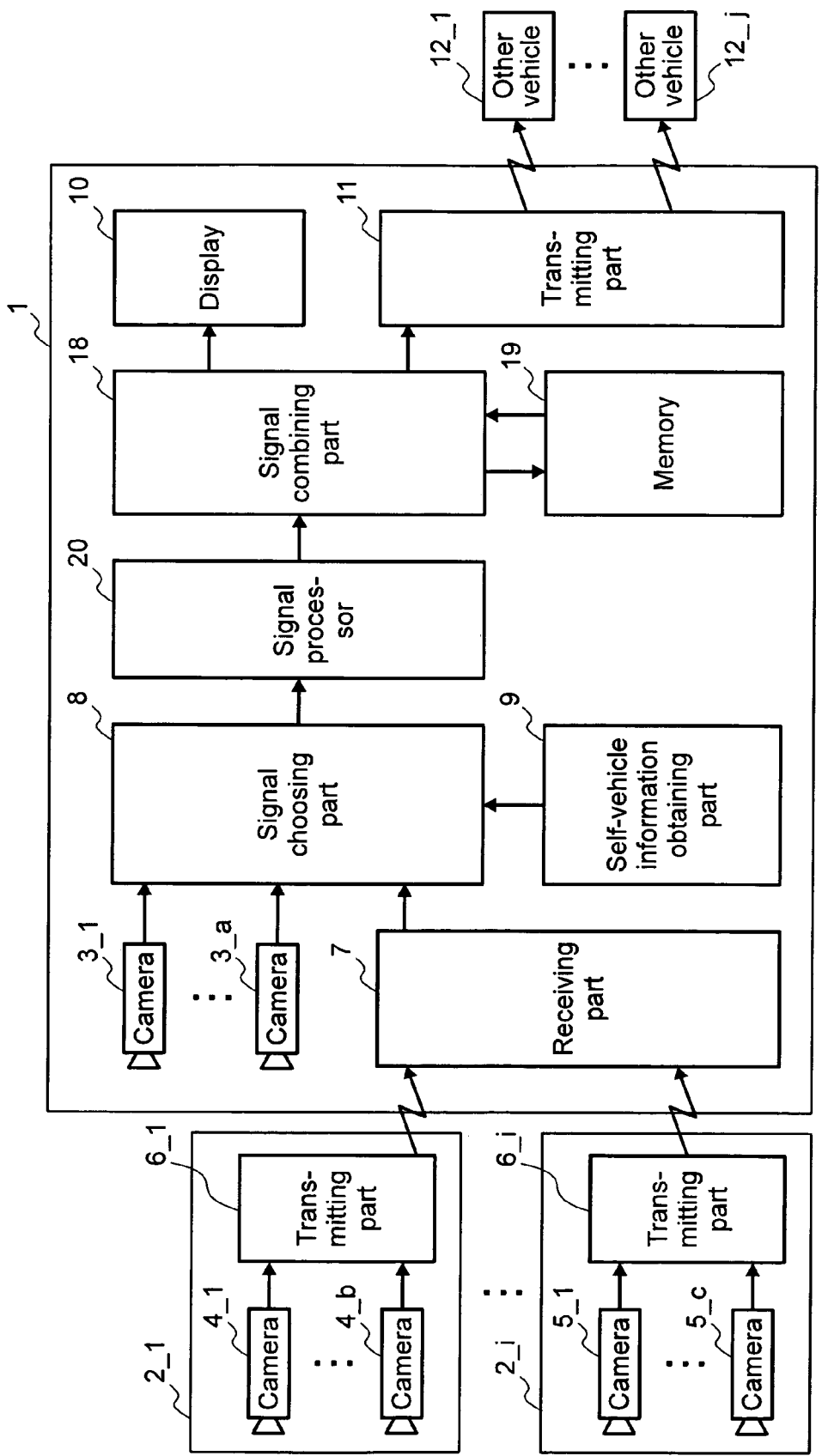

PHOTOGRAPHING APPARATUS, IMAGE SIGNAL CHOOSING APPARATUS, DRIVING ASSISTING APPARATUS AND AUTOMOBILE

CLAIM OF PRIORITY

The present application claims priority from Japanese application, serial no. JP 2005-361179, filed on Dec. 15, 2005, the content of which is hereby incorporated by reference into this application.

BACKGROUND OF THE INVENTION

1. Field of the Invention

The present invention relates to a driving assisting system using two or more image signals picked up by two or more photographing apparatuses.
Further, it relates to a method of choosing the two or more image signals.

2. Description of the Related Art

As a background art of the present technical field, there is, for example, Japanese Unexamined Patent Publication No. 2005-157581, which says "an object of the present invention is to provide an image information distribution system for a user to easily see images at more points on an expressway etc. As a solution, it says "the present invention provides a system which picks up images in a predetermined area and distributes information about such images to a mobile terminal 6 moving outside of the predetermined area. To be specific, two or more monitoring terminals 1 pick up images at different points in the predetermined area, produce information about the images, and output the information about the images. A relay apparatus 2 obtains information about two or more images outputted by two or more monitoring terminals 1, chooses information about one of two or more images, and transmits it to the outside of the predetermined area. Two or more transfer apparatuses 4 are spaced outside the predetermined area, and transmit the information about the image transmitted from the relay apparatus 2 in the form of radio waves to the mobile terminal 6. And the relay apparatus 2 changes the information about the image to choose in succession and periodically."

Moreover, as another background art, for example, there is Japanese Unexamined Patent Publication No. 2001-101566, which says that its object is "to recognize a crossing road quickly and reliably at an intersection where a driver cannot notice the crossing road (road to be a blind spot) because of an obstacle." As a solution, it says "a camera 12 is set near the intersection, a road to be a blind spot is photographed, and a wall of a private house to be an obstacle is photographed with a camera 15 embedded in a bumper of a vehicle (leading vehicle 1). And these picked up images are superimposed and displayed on a side window consisting of the semi-transparent type liquid crystal display monitor of a vehicle (following vehicle 2) which is about to enter the intersection. Thereby, the driver of the following vehicle 2 can see the road to be a blind spot as if he or she saw the obstacle through, and can perform safety confirmation quickly and reliably."

SUMMARY OF THE INVENTION

Japanese Unexamined Patent Publication No. 2005-157581 discloses the system which updates road images periodically and provides them to the driver. In order to provide images of regions which can be the driver's blind spots, it is necessary to set many photographing points on a road. Therefore, the number of that many photographing apparatuses are required. Further, a fixed-point camera cannot change its photographing position. Therefore, when there are obstacles, such as other vehicles, between the fixed-point camera and a region to be photographed, the image of the blind spot cannot be provided to the driver.

According to Japanese Unexamined Patent Publication No. 2001-101566, in addition to images picked up at a fixed point, the images picked up by cameras mounted on other vehicles are used. Thus, the information about a region to be a blind spot is provided to the driver. However, the image of the blind spot provided to the driver changes as the other vehicle moves, and it goes out of the photographing coverage of the camera of the other vehicle with a lapse of time.

Therefore, it is important, in terms of usability of the driving assisting system, to take into account the positions of the self-vehicle and the other vehicle which change from moment to moment to choose the image signal corresponding to the location, orientation, viewing angle, and moving speed of the camera mounted on each vehicle, and to provide the information about the blind spot to the driver by means of images and voice in real time.

It is an object of the present invention to improve usability of a driving assisting system.

The above object can be achieved by the inventions described in appended claims.

BRIEF DESCRIPTION OF THE DRAWINGS

These and other features, objects and advantages of the present invention will become more apparent from the following description when taken in conjunction with the accompanying drawings wherein:

FIG. 2 shows an example of a state in which the driving assisting system according to Embodiment 1 of the present invention is applied;

FIG. 6 is a block diagram showing a driving assisting system according to Embodiment 3 of the present invention;

DETAILED DESCRIPTION OF THE PREFERRED EMBODIMENTS

Figure 1:
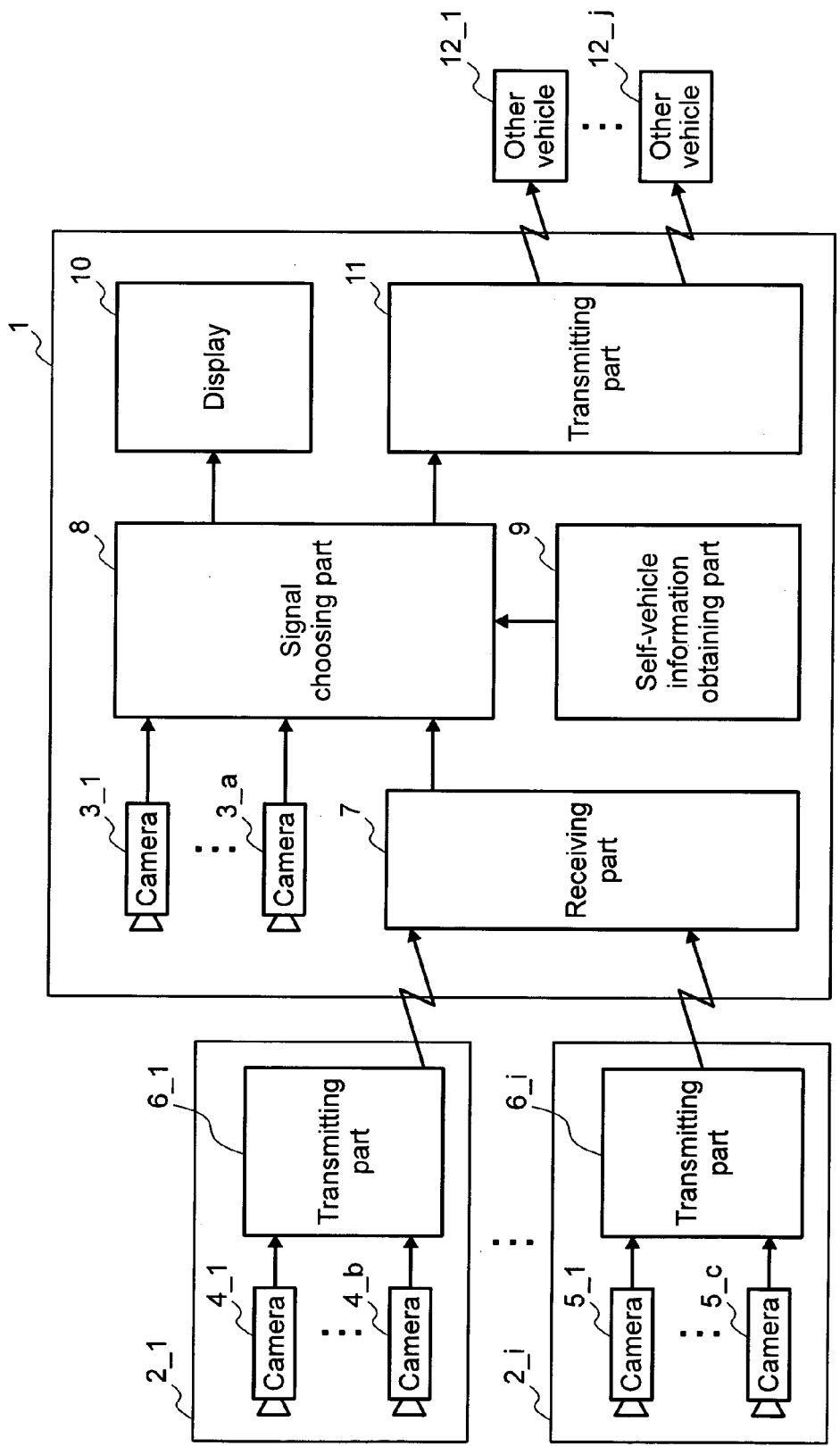
FIG. 1 is a block diagram showing a driving assisting system according to Embodiment 1 of the present invention.

First, principal symbols used in the drawings will be shown.

1 Self-vehicle
2_1-2_$i$ Other vehicles
3_1-3_$a$ Photographing apparatuses mounted on self-vehicle
4_1-4_$b$ Photographing apparatuses mounted on other vehicles
5_1-5_$c$ Photographing apparatuses mounted on other vehicles
6_1-6_$i$ Transmitting part 7 Receiving part
8 Signal choosing part
9 Self-vehicle information obtaining part
10 Display
11 Transmitting part
12_1-12_i Other vehicles
13 Self-vehicle
14 Other vehicle
15 Person
16 Obstacle
17 Other vehicle
18 Signal combining part
19 Memory
20 Signal processor
21-22 Vehicles
23-25 Cameras
26 Person
27 Mark indicating dangerous factor Now, an embodiment of the present invention will be described by referring to the drawings.

[Embodiment 1]

FIG. 1 is a block diagram showing a driving assisting system according to Embodiment 1 of the choosing method of two or more image signals of the present invention. In FIG. 1, numeral 1 denotes a self-vehicle, and 2_1-2_i (i=1, 2, 3, ...) denote i units of other vehicles. Further, 3_1-3_a (a=1, 2, 3, ...) are a units of photographing apparatuses mounted on the self-vehicle. 4_1-4_b (b=1, 2, 3, ...) are b units of photographing apparatuses mounted on the other vehicle 2_1. 5_1-5_$c\,(c=1, 2, 3, ...)$ are c units of photographing apparatuses mounted on the other vehicle 2-i. 6_1-6_i (i=1, 2, 3, ...) are transmitting parts mounted on i units of other vehicles, 7 is a receiving part, 8 is a signal choosing part, 9 is a self-vehicle information obtaining part, 10 is a display, 11 is a transmitting part, and 12_1-12_j are j units of other vehicles.

In the driving assisting system, from the other vehicles 2_1-2_i, information, including image signals picked up by a camera mounted on each vehicle as well as the location, orientation, viewing angle, and moving speed of each camera, is received through CDMA, FDMA, TDMA, or optical communications. In the self vehicle, such information is received by the receiving part 7. Including the image signals picked up by the cameras 3_1-3_a mounted on the self-vehicle, images with which a driver is provided are chosen in the signal choosing part 8, and transmitted to the display 10. In this regard, the number of the images chosen may be two or more. On the display 10, the images are shown one by one or shown on separate windows on the same screen. As other vehicles 2_1-2_i transmit image signals and camera information, the self vehicle transmits image signals picked up by the cameras 3_1-3_a mounted on the self vehicle and camera information of the self-vehicle obtained by the self-vehicle information obtaining part 9 to other vehicles 12_1-2_j.

FIG. 2 shows an example of a state in which the driving assisting system according to Embodiment 1 of the present invention is applied. In FIG. 2, numeral 13 is a self vehicle, 14 is the other vehicle, 15 is a person, 16 is an obstacle, and 17 is the other vehicle. In FIG. 2(a), since the person 15 is behind the obstacle 16, he or she cannot be seen from a driver of the self-vehicle 13. Therefore, a camera which can photograph the person 15 is detected in the following way. Suppose that a camera mounted on the approaching other vehicle 14 is obtained as a detection result in the case of FIG. 2(a). In the signal choosing part 8, an image picked up by the camera mounted on the other vehicle 14 is chosen and outputted to the display 10. Accordingly, the driver can see an image of a region to be a blind spot and can predict danger in advance.

Also, a state after a certain lapse of time is shown in FIG. 2(b). In FIG. 2(b), the person 15 is still at the position which is not visible from the driver of the self-vehicle 13. When trying to obtain an image of this blind spot from the other vehicles, the other vehicle 14 has moved, with a lapse of time, to a position from which the person 15 cannot be photographed. In order to constantly provide an image of a blind spot to a driver, it is necessary to consider the location, orientation, viewing angle, and moving speed of a camera which photographs the blind spot, and to switch to photographing by another camera dynamically before the blind spot deviates from photographing coverage.

Figure 3A:
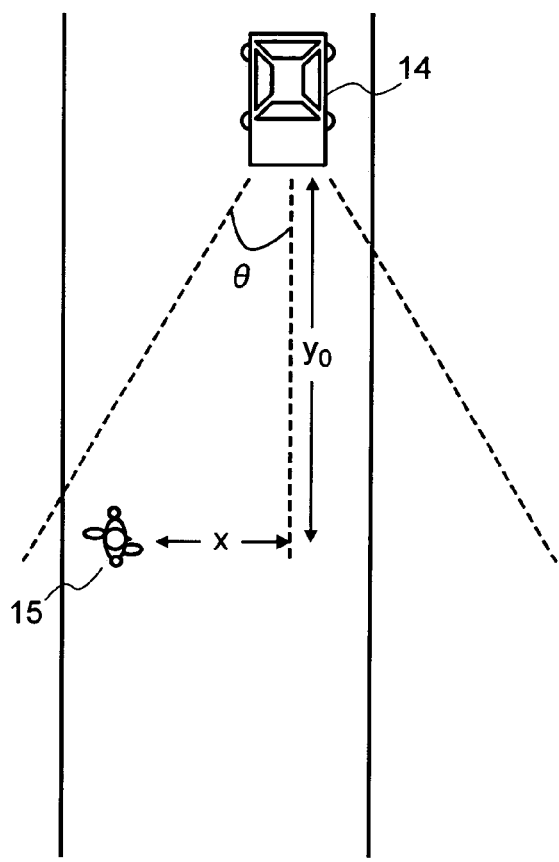
FIG. 3 shows the camera switching in the driving assisting system according to Embodiment 1 of the present invention.
Figure 3B:
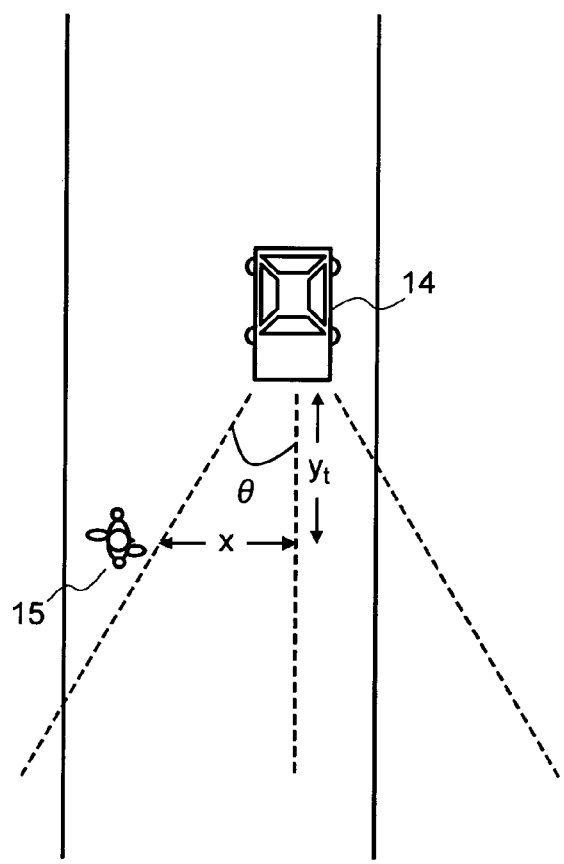

The conditions for photographing the person 15 with a camera mounted on the other vehicles 14 will be explained by referring to FIG. 3. In FIG. 3, as the camera which photographs the person 15, such a camera is considered that is mounted on a front section of the other vehicle 14, and is oriented to a moving direction of the vehicle. Suppose, as seen from the other vehicle 14, a viewing angle of the right half of the camera is θ and a distance from a center line of the viewing angle of the camera to the person 15 is x. First, a state as shown in FIG. 3(a) is considered as an initial state. Suppose a distance (direction-of-movement distance of the vehicle) from the other vehicle 14 to the person 15 is $y_0$. Parameters, such as x and $y_0$ can be determined by, for example, assuming that there is a blind spot in a region 10 m ahead of the self-vehicle and by obtaining location information on the self-vehicle and other vehicle by global positioning system etc. FIG. 3(a) shows a state wherein the person 15 is in a photographable region of the camera mounted on the other vehicle 14. FIG. 3(b) shows a state wherein it has become impossible to photograph the person 15 with the camera mounted on the vehicle 14 after a lapse of time t. Suppose that a distance (direction-of-movement distance of the vehicle) from the other vehicle 14 to the person 15 is $y_t$. In this regard, if the moving speed of the other vehicle 14 is v, the following equation can be set up with respect to time t during which the person 15 can be photographed with the camera mounted on the other vehicle 14.

$$y_0 - y_t > vt \tag{1}$$

When the above is transformed, the following equation is obtained.

$$(y_0 - (x/\tan\theta))/v > t \tag{2}$$

In the equation (2), $y_0$ is a distance (direction-of-movement distance of the vehicle) from the other vehicle 14 to the person 15, and x is a distance from a center line of a viewing angle of the camera to the person 15. Therefore, they are obtained as location information on the camera transmitted to the self-vehicle from the other vehicle. Similarly, θ is a viewing angle of the right half of the camera, and is obtained as orientation information on the camera transmitted from the other vehicle to the self-vehicle. And since v is the moving speed of the other vehicle 14, it is equivalent to the moving speed of the camera transmitted to the self-vehicle from the other vehicle. Therefore, the time t during which the person 15 can be photographed with the camera mounted on the other vehicle 14 can be calculated by using the camera information transmitted to the self-vehicle from the other vehicle. It becomes possible to provide without interruption the image of a blind spot to the driver by switching to photographing with another camera before the time t has elapsed. In the case of FIG. 2(b), by the above calculation, before the person 15 moves out of the photographable region of the camera mounted on the other vehicle 14, switching is made to the image of the camera mounted on the other vehicle 17 following the other vehicle 14. Thus, provision of the image of the region to be a blind spot to the driver can be maintained. Further, the camera to be switched may be not only a camera mounted on the other vehicle but also a fixed-point camera installed on the road. If the above moving speed v is set to 0, it can be treated similarly.

Thus, according to the present embodiment, with respect to a blind spot of the driver which changes continuously with a lapse of time, the location, orientation, viewing angle, and moving speed of the camera mounted on the other vehicle running near the self-vehicle are constantly detected, thereby the camera which can photograph the driver's blind spot under the best condition is chosen. Thus, it becomes possible to provide, without interruption, the image of the blind spot to the driver in real time.

[Embodiment 2]

Figure 4:
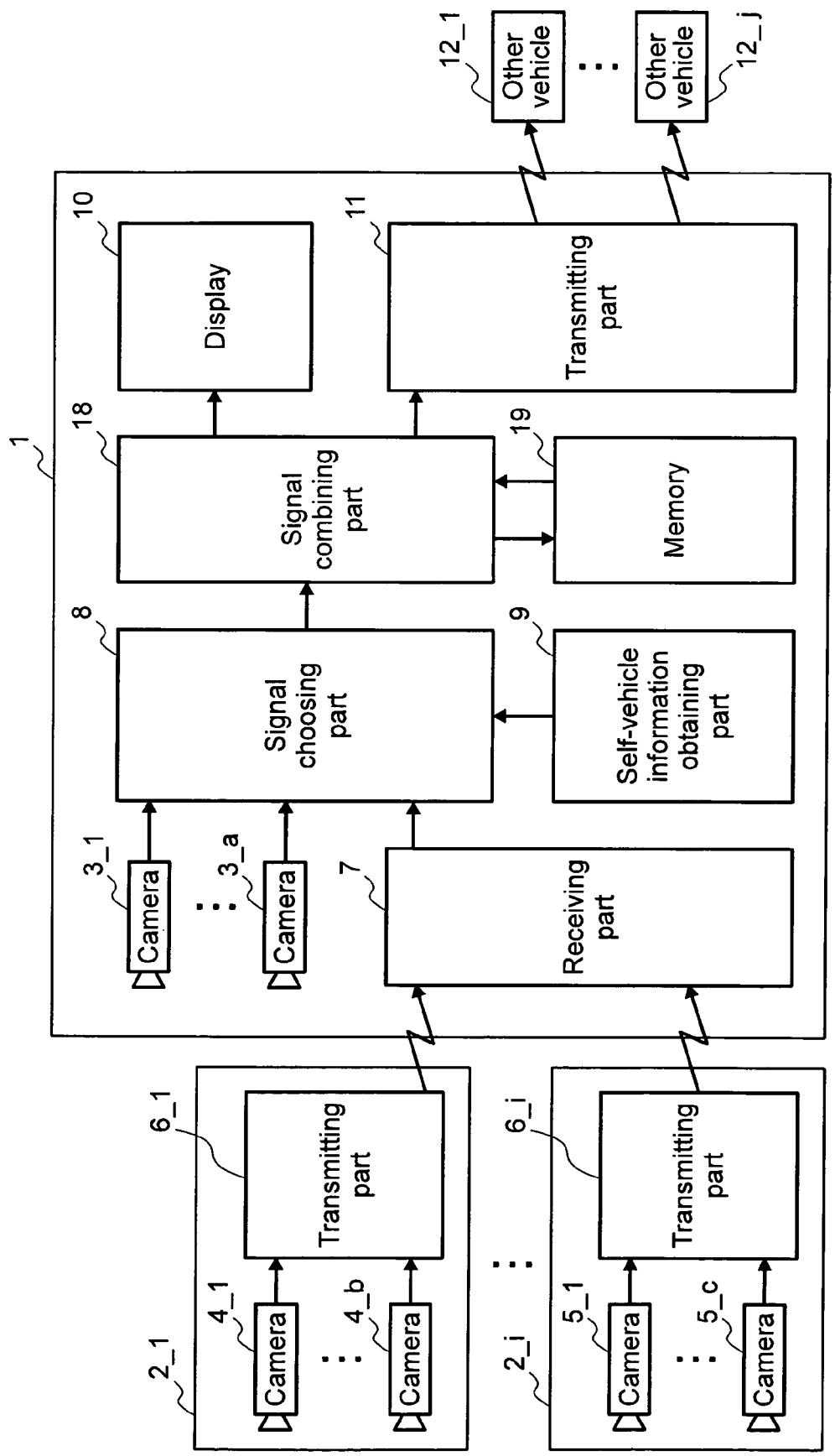
FIG. 4 is a block diagram showing a driving assisting system according to Embodiment 2 of the present invention.

FIG. 4 is a block diagram showing a driving assisting system according to Embodiment 2 of the choosing method of two or more image signals of the present invention. Unlike the block diagram of Embodiment 1 of the present invention in FIG. 1, FIG. 4 has a signal combining part 18 and a memory 19. The signal combining part 18 superimposes or combines two or more image signals chosen by the signal choosing part 8, and outputs the produced image signal to the display 10. Further, the memory 19 is a buffer which stores image data temporarily during processing.

In Embodiment 1, there has been shown a method to provide, without interruption, the image of the blind spot to the driver by choosing and dynamically switching to the camera which can photograph the driver's blind spot based on the information about the location, orientation, viewing angle, and moving speed of the camera mounted on other vehicles. In the present embodiment, as an image of the blind spot to the driver, there is provided the one made by superimposing or combining and displaying two or more images picked up by two or more cameras.

For example, the signal choosing part 8 chooses the camera which can pick up the image of a driver's blind spot at the best location. However, there may be no camera which can photograph the whole blind spot because of an obstacle etc. In such a case, by making use of images picked up by two or more cameras and by superimposing or combining such images and displaying the result in the signal combining part 18, it becomes possible to provide blind-spot images to the driver.

Figure 5A:
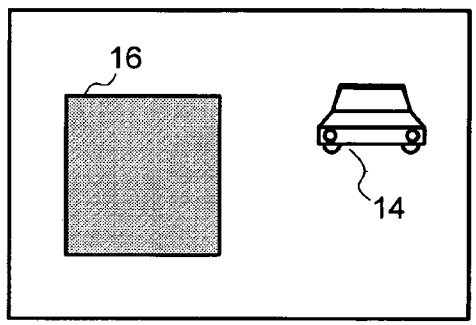
FIG. 5 shows an example of combining and displaying images in the driving assisting system according to Embodiment 2 of the present invention.
Figure 5B:
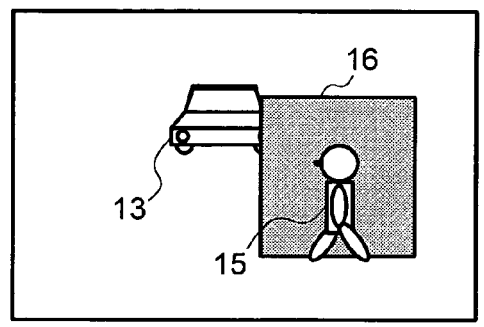
Figure 5C:
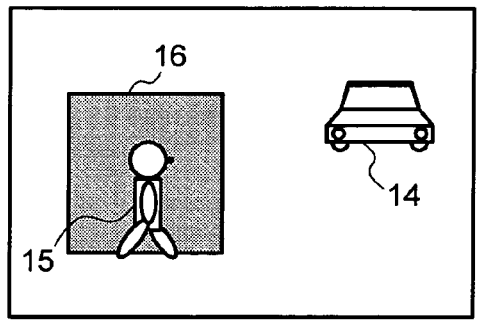

As for the image provided to the driver, it may be provided such that an image picked up by the camera mounted on the other vehicle is superimposed or combined and displayed with an image picked up by the camera mounted on the self-vehicle. For example, in the case of the state shown in FIG. 2, information on a person 15 in a blind spot of the self-vehicle 13 can be obtained from images picked up by cameras mounted on other vehicles 14 and 17. In Embodiment 1, when providing an image to the driver, the method to provide the picked up image itself is shown. However, by using the signal combining part 18, it becomes possible to provide information more understandable to the driver. FIG. 5(a) shows an image which is a view ahead of a self-vehicle photographed by a camera mounted on the self-vehicle 13 in FIG. 2. Naturally, the person 15 is not shown because he or she is behind the obstacle 16. Further, FIG. 5(b) shows an image which is a view ahead of the vehicle photographed by the camera mounted on the other vehicle 14 in FIG. 2. In the signal combining part 18, the image of FIG. 5(a) and the image near the person 15 of FIG. 5(b) are turned around and combined to obtain the image of FIG. 5(c). By being provided with the image of FIG. 5(c), the driver can see the image as if the back side of the obstacle were seen from his or her viewpoint.

Thus, according to the present embodiment, even in the case where the image of the driver's blind spot cannot completely be picked up with a single camera, it becomes possible to provide the image of the blind spot to the driver by superimposing or combining and displaying the images picked up by two or more cameras mounted on other vehicles running near the self-vehicle. Further, by combining and displaying the image picked up by the camera mounted on the self-vehicle with the image of the driver's blind spot picked up by the camera mounted on other vehicle, it is possible to provide an image as if the back side of the obstacle were seen from the driver's viewpoint.

[Embodiment 3]

FIG. 6 is a block diagram showing a driving assisting system according to Embodiment 3 of the choosing method of two or more image signals of the present invention. Unlike FIG. 4 which is the block diagram of Embodiment 2 of the present invention, FIG. 6 has a signal processor 20. The signal processor 20 performs object recognition with respect to the image signal chosen by the signal choosing part 8.

Figure 7:
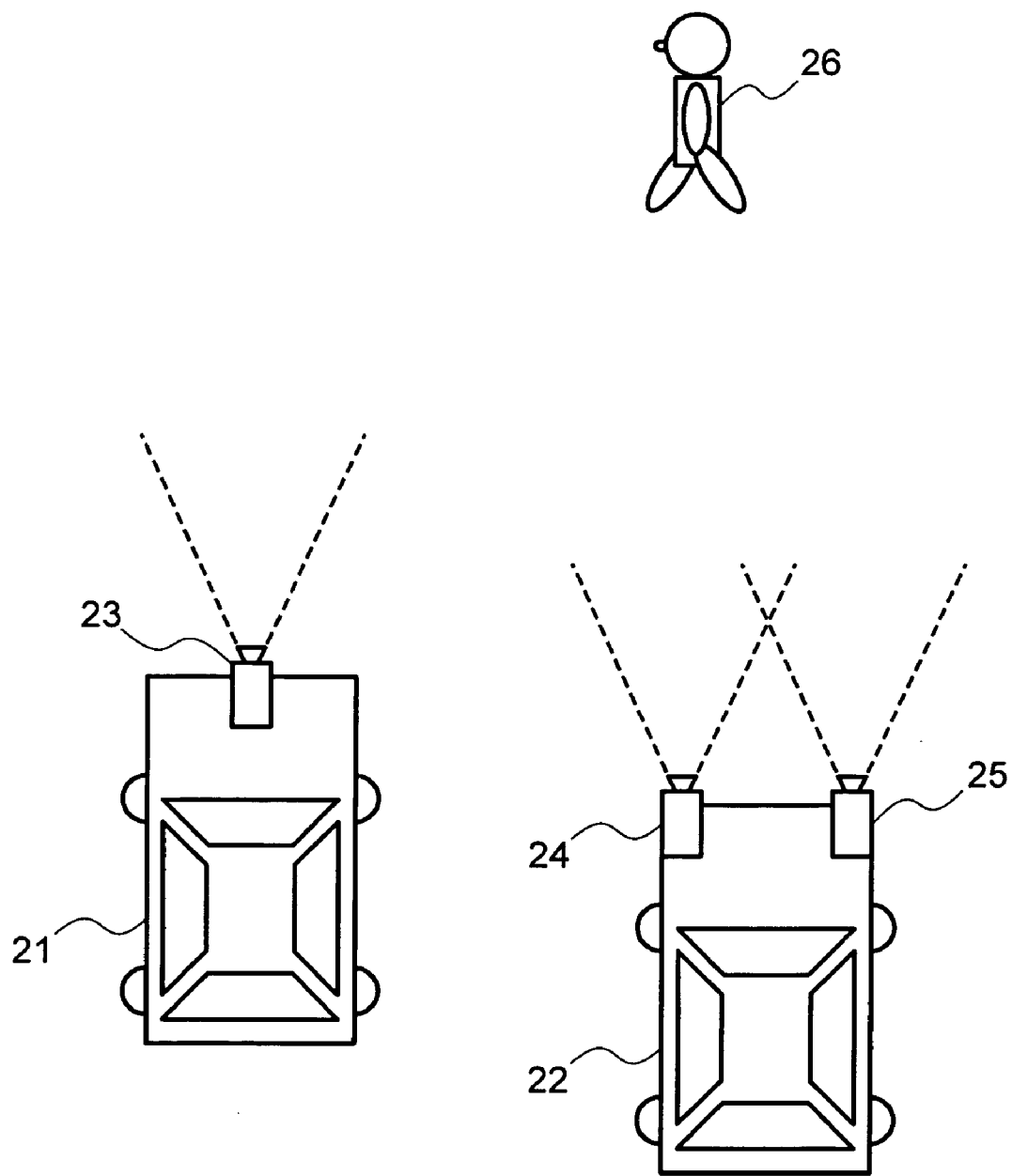
FIG. 7 explains object recognition in the driving assisting system according to Embodiment 3 of the present invention.

An example of the object recognition concerning Embodiment 3 of the choosing method of two or more image signals of the present invention will be explained by referring to FIG. 7. In FIG. 7, the numerals 21 and 22 are vehicles on which cameras are mounted, 23 is a camera mounted on the vehicle 21, 24 and 25 are cameras mounted on the vehicle 22, and 26 is a person who is ahead of the vehicles 21 and 22. When trying to recognize the person 26, if one image signal is chosen by the signal choosing part 8 out of the image signals picked up by the cameras 23-25, it is possible to recognize the person by a single eye. Further, when two or more image signals are chosen, it becomes possible to recognize the person with higher precision by photographing in stereo.

Now, a case where the photographing in stereo is performed is considered. In order to recognize the person 26, based on information about the location, orientation, viewing angle, and moving speed of each camera, the signal choosing part 8 determines which camera should be chosen. If the cameras 24 and 25 are chosen, these two cameras photograph in stereo to recognize the person 26. However, when the person 26 moves leftward as seen from the vehicle 22, with a lapse of time, it goes out of the region which can be photographed with the camera 25. However, the signal choosing part 8 constantly detects a camera which can photograph the person 26. Therefore, when the person 26 comes into the photographable region of the camera 23, it is possible to continue recognizing the person by switching to the photographing in stereo with the cameras 23 and 24. In this regard, even when there is a case where the person 26 can be photographed with one camera alone, the person can be recognized continuously by switching to single-eye recognition temporarily.

In Embodiment 1, the photographable conditions of other-vehicle cameras are described regarding the case where the driver's blind spot is photographed by the cameras mounted in other vehicles. In Embodiment 1, the process on the assumption that there is a blind spot a certain distance from the self-vehicle has been described as an example. However, by photographing in stereo, it is possible to recognize an obstacle which has made the blind spot and to calculate a distance to the obstacle. Thus, instead of photographing on the assumption that there is a blind spot at a certain distance from the self-vehicle, the following process becomes possible. Namely, when the obstacle has been recognized by the photographing in stereo, it is judged that a blind spot exists there, a distance to the obstacle is calculated, and a camera which can photograph the blind spot is chosen.

In the present Embodiment, with respect to image signals picked up by cameras mounted on the self-vehicle or other vehicles, the configuration in which object recognition is performed in the signal processor 20 has been shown. However, object recognition may be performed by each camera. In such a case, it is realizable in the driving assisting system shown in FIGS. 1 and 4. In each camera, photographing and recognition processing are performed. In the signal choosing part 8, the image signal in which a recognition object needed by the driver is obtained is chosen. A merit of recognizing an object on the camera side is that the choice in the signal choosing part 8 in which a recognizing result image is also considered is possible. For example, a camera which can photograph a recognition object under the best state is chosen according to the information on the location, orientation, viewing angle, and moving speed of each camera. However, it is possible that the image picked up by the camera is blurred, or an unexpected obstacle appears in front of the camera. When object recognition is not performed on the camera side, even if object recognition is performed with respect to the image picked up under such a state, the expected result cannot be obtained. However, when the object recognition is performed on the camera side, with respect to the image signal from which the expected result is not obtained, it is not chosen in the signal choosing part 8. Accordingly, it becomes possible to switch an image signal from another camera and to choose one from which the expected recognition result is obtained.

Figure 8A:
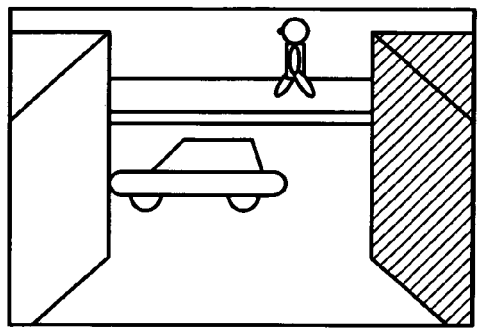
FIG. 8 shows an example of a display method in the driving assisting system according to Embodiment 3 of the present invention.
Figure 8B:
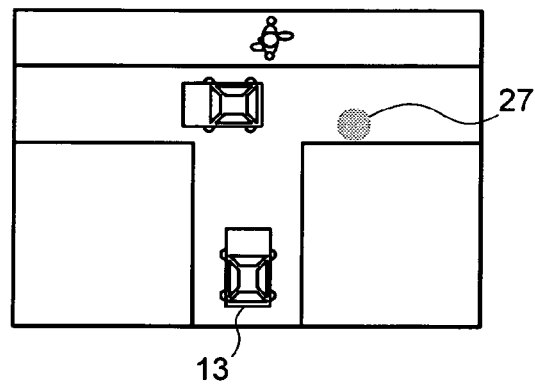

Now, an example of a display method when providing the driver with the result of object recognition is shown. As a result of the object recognition performed about the image signal picked up by the camera mounted on the self-vehicle or other vehicle, when a person etc. are detected in the blind spot of the driver, such information is provided to the driver. As shown in Embodiment 2, there is be a method wherein the image of the region being a blind spot to the driver is superimposed or combined and displayed with the image picked up by the camera mounted on the self-vehicle. However, the present embodiment shows a method of displaying in a different manner. FIG. 8 shows an example of an information display in the case where the self-vehicle 13 is approaching an intersection of low visibility and a person is in the driver's blind spot. In this regard, it is assumed that a person is in a region hidden by a wall of the forward right of the self-vehicle 13. It is possible to recognize this person from an image signal picked up by a camera mounted on the other vehicle running along the street at the end which the self-vehicle 13 is entering. FIG. 8(*a*) shows an example wherein the recognition result is shown by a driver's viewpoint, and a wall behind which the person is hidden is colored and displayed. Further, FIG. 8(*b*) shows an example wherein a map in which the self-vehicle 13 is viewed from the above is displayed and a mark 27 is shown on the person's location recognized in the driver's blind spot. Thus, in stead of superimposing or combining and displaying the image of the driver's blind spot with the image picked up by the camera mounted on the self-vehicle, a region in which a dangerous factor is hidden is colored and displayed. Thereby, a simple and explicit display can be provided to the driver. Further, not only information through images is provided to the driver but also, based on a recognition result, information may be provided through voice saying "At the next intersection, a pedestrian is approaching from the right."

Thus, according to the present embodiment, by using cameras mounted on vehicles, the object recognition by a single eye or stereo photographing becomes possible. While recognizing an object, because the recognition object moves, it may go out of the photographable region of a camera. However, object recognition without interruption becomes possible by switching cameras to be used dynamically. Further, by performing object recognition in the photographing part, the choice of an image considering the recognition result image transmitted from each camera is possible. Therefore, by using this together with the camera choosing method based on information about the location, orientation, viewing angle, and moving speed of each camera, the image wherein the recognition object which the driver needs is reliably obtained can be chosen. With respect to the recognition result, when a dangerous factor is hidden in a region to be the driver's blind spot, it becomes possible to provide information for the driver to understand easily by giving color to the recognition result and displaying it simply and explicitly. Further, it also becomes possible to provide information by means of voice based on the recognition result.

As described above, the present invention can be applied to a transportation system and a driving assisting apparatus.

Further, according to the present invention, usability of the driving assisting system is improved.

While we have shown and described several embodiments in accordance with our invention, it should be understood that disclosed embodiments are susceptible to changes and modifications without departing from the scope of the invention. Therefore, we do not intend to bound by the details shown and described herein but intend to cover all such changes and modifications as fall within the ambit of the appended claims.

What is claimed is:

1. An assisting system comprising:
n units (n≧1) of first photographing devices with which an apparatus is equipped, the n units of the first photographing devices being configured to pick up images and output image signals;
a receiving device configured to wirelessly receive image signals outputted from m units (m≧1) of second photographing devices with which other external apparatus is equipped and to receive information regarding location, orientation, viewing angle, and moving speed of the m units of the second photographing devices, wherein part of photographing coverage of at least one of the second photographing devices is common with part of photographing coverage of at least one of the first photographing devices;
a selector configured to choose k units (n+m>k≧1) of image signals out of image signals outputted from n units of the first photographing devices and image signals outputted from m units of the second photographing devices and received by the selector;
a controller configured to control choice of image signals by the selector by using information on the location, orientation, viewing angle, and moving speed of the n units of the first photographing devices and of the m units of the second photographing devices, and
a signal combiner to combine at least one of the chosen image signals outputted from n units of the first photographing devices with an image signal cut out from at least one of the chosen image signals outputted from m units of the second photographing devices and output a combined image signal, the cut out image signal being an image signal of a blind spot for all of n units of the first photographing devices, wherein the controller is configured to dynamically switch the chosen image signals from the selector by using relative information between the location, orientation, viewing angle and moving speed of the n units of the first photographing devices and the location, orientation, viewing angle and moving speed of the m units of the second photographing devices so that the blind spot will remain, without interruption, within photographic coverage within the combined image signal, wherein the controller calculates, by using information on the location, orientation, viewing angle, and moving speed of n units of the first photographing devices and m units of the second photographing devices, the time taken by a specific object in a common region of the photographing coverage of the first and second photographing devices to deviate from the common region;

wherein the controller controls, before the above time elapses, to switch the choice of image signals such that one or more of the image signals of p units (p≧1) of third photographing devices with which the other external apparatus is equipped is chosen; and wherein the specific object exists in the common region of the photographing coverage of the first and third photographing devices.

2. A driving assisting apparatus comprising:
n units (n≧1) of first photographing devices mounted on a self-vehicle and picking up images around the self-vehicle;
a detector to detect information about the location, orientation, viewing angle, and moving speed of the first photographing devices;
a receiver to wirelessly receive image signals picked up by m units (m≧1) of second photographing devices mounted on an other vehicle to picked up images around the other vehicle and picking up images around the self-vehicle, and to receive information on the location, orientation, viewing angle, and moving speed of the second photographing devices;
a selector to choose k units (n+m>k≧1) of image signals by using, out of the image signals picked up by said first and second photographing devices, one or more information on the location, orientation, viewing angle, and moving speed of said first photographing devices detected by said detector and by using one or more information on the location, orientation, viewing angle, and moving speed of the second photographing devices received by said receiver;
a display to display k units of image signals chosen by said selector; and
a signal combiner to combine at least one of the chosen image signals outputted from n units of the first photographing devices with an image signal cut out from at least one of the chosen image signals outputted from m units of the second photographing devices and output a combined image signal, the cut out image signal being an image signal of a blind spot for all of n units of the first photographing devices,
wherein a controller is configured to dynamically switch the chosen image signals from the selector by using relative information between the location, orientation, viewing angle and moving speed of the n units of the first photographing devices and the location, orientation, viewing angle and moving speed of the m units of the second photographing devices so that the blind spot will remain, without interruption, within photographic coverage within the combined image signal, wherein the controller calculates, by using information on the location, orientation, viewing angle, and moving speed of n units of the first photographing devices and m units of the second photographing devices, the time taken by a specific object in a common region of the photographing coverage of the first and second photographing devices to deviate from the common region;

wherein the controller controls, before the above time elapses, to switch the choice of image signals such that one or more of the image signals of p units (p≧1) of third photographing devices with which the other vehicle is equipped is chosen; and wherein the specific object exists in the common region of the photographing coverage of the first and third photographing devices.

3. A driving assisting apparatus according to claim 2, wherein said display displays two or more image signals chosen by said selector in succession or in separate windows on the same screen.

4. A driving assisting apparatus according to claim 2, wherein said display combines or superimposes and displays two or more image signals chosen by said selector.

5. A driving assisting apparatus according to claim 2 comprising a recognizing device to perform object recognition with respect to an image signal chosen by said selector, wherein said display displays an object recognized by said recognizing device.

6. A driving assisting apparatus according to claim 2, comprising a stereo-photographing processor to perform photographing in stereo by using two or more image signals chosen by said selector.

7. A driving assisting apparatus according to claim 2, wherein object recognition is performed in said first and second photographing devices and image signals of objects to be recognized including a person and/or an obstacle around the self-vehicle are chosen and displayed.

8. A driving assisting apparatus according to claim 2, wherein, with respect to a region to be the driver's blind spot which cannot be photographed by said first photographing devices because of an obstacle, image signals picked up by said second photographing devices are chosen and displayed.

9. A driving assisting apparatus according to claim 8, wherein, with respect to a region to be the driver's blind spot which cannot be photographed by said first photographing devices because of an obstacle, when image signals picked up by said second photographing devices are chosen and displayed, a notice in voice about such processing is outputted.

10. A driving assisting apparatus according to claim 8, wherein when image signals picked up by said second photographing devices are chosen and displayed with respect to a region to be the driver's blind spot which cannot be photographed by said first photographing devices because of an obstacle, the obstacle portion is colored and its image is explicitly displayed.

11. A vehicle having n units (n≧1) of first cameras and a monitor for displaying images picked up by the first cameras, said vehicle comprising:
a receiver to wirelessly receive image signals outputted from m units (m≧1) of second cameras with which a self-vehicle is not equipped, and to receive information regarding location, orientation, viewing angle and moving speed of the second cameras, wherein part of photographing coverage of at least one of the second cameras is in common with part of photographing coverage of at least one of the first cameras;
a selector to choose k units (n+m>k≧1) of images signals out of image signals outputted from n units of the first cameras and image signals outputted from m units of the second cameras and received by the selector; and a controller to control choice of image signals by the selector by using one or more information on the location, orientation, viewing angle, and moving speed of the n units of the first cameras and of the m units of the second cameras, wherein, with respect to a region of photographing coverage to be a driver's blind spot which cannot be photographed by the first camera because of an obstacle, at least one of the image signals picked up by the second cameras is chosen and displayed on the monitor, and further comprising:

a signal combiner to combine at least one of the chosen image signals outputted from n units of the first cameras with an image signal cut out from at least one of the chosen image signals outputted from m units of the second cameras and output a combined image signal, the cut out image signal being an image signal of a blind spot for all of n units of the first cameras, wherein the controller is configured to dynamically switch the chosen image signals from the selector by using relative information between the location, orientation, viewing angle and moving speed of the n units of the first cameras and the location, orientation, viewing angle and moving speed of the m units of the second cameras so that the blind spot will remain, without interruption, within photographic coverage within the combined image signal, wherein the controller calculates, by using information on the location, orientation, viewing angle, and moving speed of n units of the first cameras and m units of the second cameras, the time taken by a specific object in a common region of the photographing coverage of the first and second cameras to deviate from the common region;

wherein the controller controls, before the above time elapses, to switch the choice of image signals such that one or more of the image signals of p units ($p \geq 1$) of third cameras with which the self-vehicle is not equipped is chosen; and wherein the specific object exists in the common region of the photographing coverage of the first and third cameras.

* * * * *